United States Patent Office 3,154,189
Patented Oct. 27, 1964

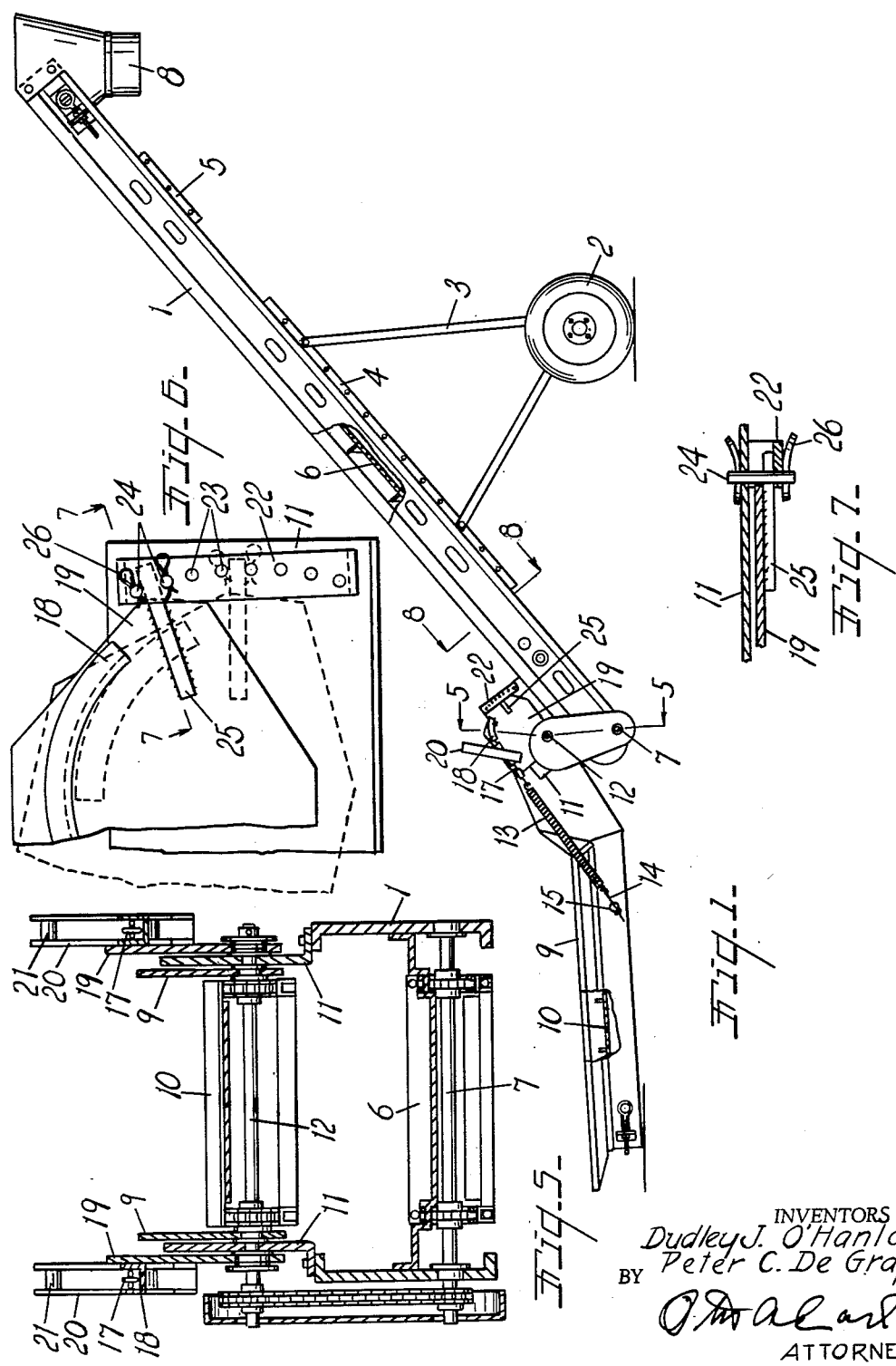

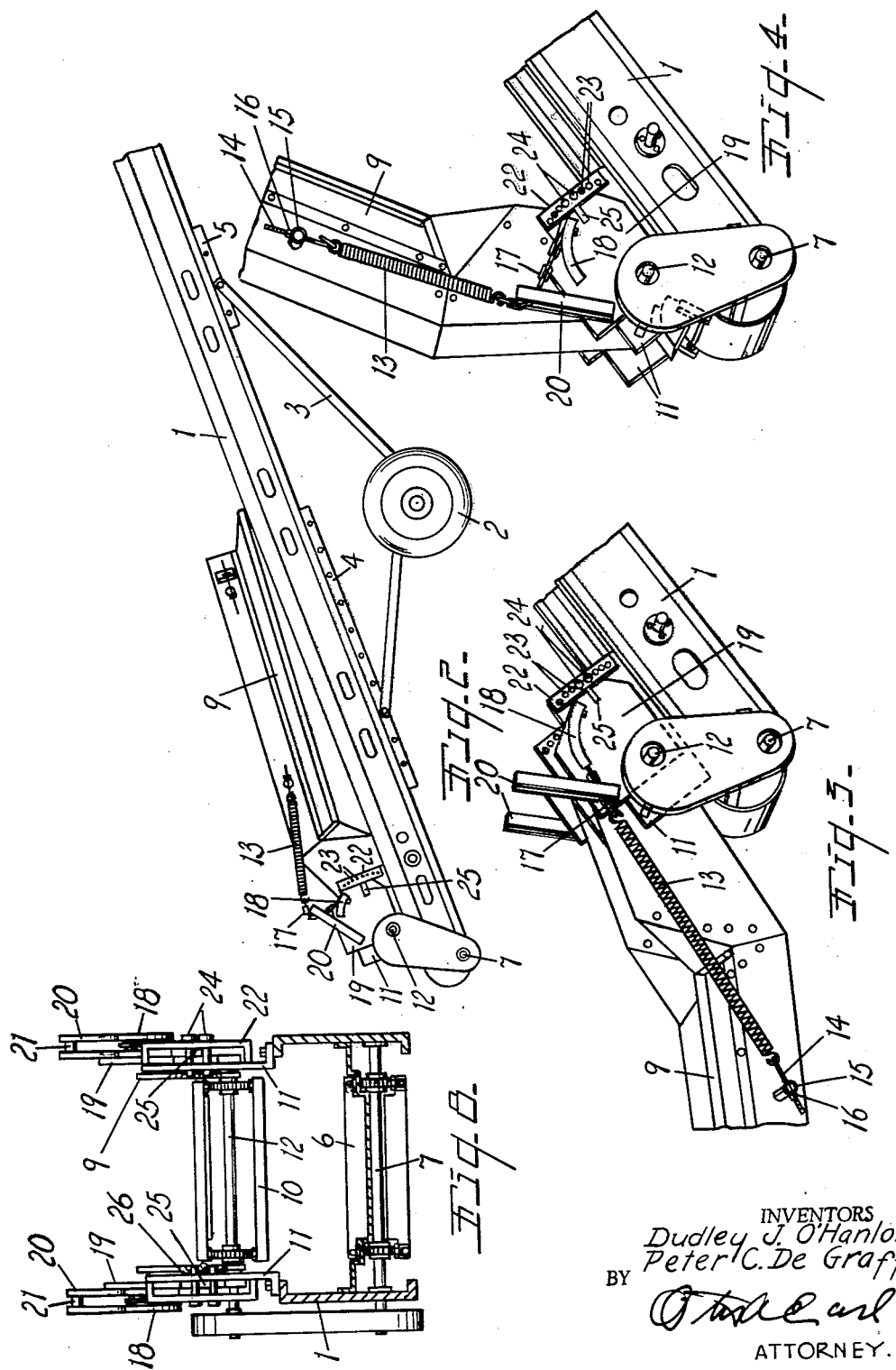

3,154,189
CONVEYOR APPARATUS
Dudley J. O'Hanlon and Peter C. De Graff, Manhattan, Kans., assignor to Viking Manufacturing Company, Manhattan, Kans.
Filed July 8, 1963, Ser. No. 293,447
16 Claims. (Cl. 198—91)

This invention relates to conveyors of the portable elevator type. The main objects of this invention are:

First, to provide a conveyor of the portable elevator type including a manually adjustable hopper which requires little effort to adjust it to and from use position.

Second, to provide a portable conveyor of the above stated type in which the hopper is compactly collapsed upon the elevator.

Third, to provide an elevator conveyor including a hopper with supporting means for the hopper which may be adjusted so that the hopper is supported in variable use positions.

Fourth, to provide a structure with counterbalance spring means which can be readily adjusted to compensate for variations in spring tension and variations in weight of material used in manufacture.

Fifth, to provide an elevator assembly having these several advantages, the production of which is relatively economical.

Objects relating to details and economies of the invention will appear from the description to follow. The invention is defined and pointed out in the claims.

A preferred embodiment of the invention is illustrated in the accompanying drawing, in which:

FIG. 1 is a side elevational view with the hopper in its extended position.

FIG. 2 is a fragmentary side elevational view with the hopper in collapsed position, the elevator being illustrated in its lowered position upon its supporting wheels which is desirable for transporting a substantial distance.

FIG. 3 is an enlarged perspective view illustrating structural details of the connection for the hopper to the elevator, the hopper being illustrated in its lowermost use position as is indicated in FIG. 1.

FIG. 4 is a fragmentary perspective view corresponding to that of FIG. 3 with the hopper in partially collapsed position.

FIG. 5 is an enlarged fragmentary view in section on a line corresponding to the broken line 5—5 of FIG. 1.

FIG. 6 is an enlarged fragmentary view illustrating structural details of the connection for the hopper to the elevator, parts being shown in one position by full lines and in another position by dotted lines.

FIG. 7 is a fragmentary view on a line corresponding to line 7—7 of FIG. 6.

FIG. 8 is a fragmentary view in section on a line corresponding to line 8—8 of FIG. 1.

It should be understood that in practice a motor is provided, supportedly mounted on the elevator and having driving connections to the endless conveyor with which the elevator is provided and driving connections to the conveyor of the hopper.

In the embodiment of our invention illustrated, the portable elevator designated by the numeral 1 is provided with wheels 2, the wheel struts 3 being adjustably connected to the elevator body member by the coupling unit 4 which has a plurality of spaced holes adapted to receive the connecting bolts for the struts. That detail does not form part of the applicants' present invention but it will be understood that it is desirable that the elevator be capable of a wide range of angular adjustment and to permit its adjustment to collapsed position, and as shown in FIG. 2 the elevator frame is provided with a bracket 5 with which the outer struts 3 may be engaged.

The elevator is provided with a conveyor designated generally by the numeral 6, a driven sprocket being mounted on the shaft 7. A discharge spout 8 is provided at the outer end of the elevator. It should however be understood that the apparatus is adapted for a wide range of uses.

The hopper designated generally by the numeral 9 is provided with a conveyor designated generally by the numeral 10. This hopper, industrially, sometimes called "boot" is pivotally mounted on the upwardly projecting brackets 11 mounted on the front end of the elevator, these brackets and the pivots for the hopper being arranged so that the hopper may be swingably or pivotally adjusted from the extended position shown in FIG. 1 to the fully collapsed position shown in FIG. 2 in which it supportedly engages the top of the elevator.

It will be noted that the conveyor of the hopper, when the hopper is in extended or use position, discharges upon the front end of the elevator conveyor.

It is here desired to point out that to the applicants' knowledge, Viking Manufacturing Company has manufactured and sold conveyor apparatus of the general type of this application (that is, including an elevator and a hopper) for several years but that structure did not have anything corresponding structurally to the hopper mounting and counterbalancing features of this invention. That is mentioned to avoid confusion.

The brackets 11 are fixedly mounted on the frame members of the elevator to project upwardly therefrom. The hopper is pivotally mounted on the shaft 12 so that it may be swung from extended position as shown in FIGS. 1 and 3 or to fully collapsed position as shown in FIG. 2.

It will be understood that the hopper is of substantial weight as it includes the conveyor assembly, such as illustrated, and that very frequently it is desired to shift the apparatus from one use position to another use position. It is desirable to variably position the hopper, that is, position it as indicated in FIGS. 1 and 2 and to variably receiving positions between that position and its inoperative or collapsed position. That variable positioning is desirable to receive the discharge from a wagon or truck, for example, and for the type of material handled.

The counterbalancing spring 13 is adjustably connected at its outer end to the hopper by means of the threaded coupling member 14 which is disposed through a lug 15 projecting from one side of the hopper, a nut 16 being arranged on the outer side of the lug 15.

The inner end of the spring is connected to the link connector or chain 17, the inner end of which is engaged with the lug 18 on the coupling member 19 which is adjustably connected to one of the brackets 11.

The nonspringable connecting member 17, desirably a chain, is disposed between the upwardly projecting guide members 20 which are provided with a stop or lug 21 at their outer ends; see FIG. 5.

It will be noted that when the hopper is in its lowered position the counterbalanced connector 17 is in lowered position within the guide support member 20 and when it is in its partially collapsed position, as shown in FIG. 4, and in fully collapsed position it is in engagement with the lug 21 which in the embodiment illustrated is a crosspiece between the members 20. With this arrangement, the counterbalance spring is effective in counterbalancing the weight of the hopper in its extended position and in its collapsed position. It will be understood that the tension of the spring is not sufficient to lift the hopper from its extended or use position or from its collapsed position but it does counterbalance the hopper so that there is little manual effort required to adjust it to or from use position.

Another feature of our invention is that it is sometimes, as stated, desirable to support the hopper in what we have designated an intermediate position and to accomplish that coupling means are provided to support the coupling member 19 in variable positions as is indicated in FIG. 6 and that is accomplished by providing the supporting bracket 11 with a member 22 having a plurality of vertically spaced holes 23 adapted to receive the stop or anchoring pins 24. These holes are spaced so that the pins 24 are spaced to receive the projecting lug 25 fixedly secured to the member 19. In the embodiment illustrated, cotter pins 26 are provided for the pins 24. With this arrangement of parts, a wide range of adaptability and adaptations is provided.

One advantage in supporting the hopper in an elevated use position is that a wagon or truck to be unloaded may be supportingly engaged therewith so that the material on the vehicle may be directly placed thereon.

We have illustrated and described our invention in a highly practical commercial embodiment thereof. We have not attempted to illustrate other adaptations and embodiments as it is believed that this disclosure will enable those skilled in the art to embody our invention as may be desirable for particular forms or designs of boots and hoppers.

Having thus described the invention what is claimed as new is:

1. A conveyor apparatus comprising a portable elevator including an elongated body member provided with a way and an endless conveyor operatively associated with the way, supporting wheels on which the elevator body member is mounted for translation thereof and for vertical tilting adjustment, a hopper including an elongated body member provided with a way and with an endless conveyor operatively associated with the way, coupling means for supportingly and pivotally coupling said hopper body member to the front end of said elevator body member with the inner end of the hopper conveyor in discharging relation to the said elevator conveyor and which permits the pivotal adjustment of said hopper body member to collapsed position upon and substantially parallel to the elevator body member and to outwardly projecting variable use positions, said coupling means comprising upwardly projecting laterally spaced brackets disposed at the front end of said elevator body member and between which the inner end of said hopper body member is disposed, said hopper body member having coupling members pivotally mounted on said brackets, a counterbalance spring adjustably connected at its outer end to said hopper body member in substantially spaced relation to its pivotal connection to said brackets on said elevator, a flexible connector member for the inner end of said spring to one of said coupling members on said hopper, said coupling member being provided with an upwardly projecting arm with which said spring connector is slidably and guidingly engaged and which is provided with a lug with which said spring connector member engages when the hopper reaches partially collapsed position above said elevator, one of said brackets being provided with a plurality of vertically spaced holes, said coupling member being provided with a projecting lug disposed in overlapping relation to the portion of the bracket having the spaced holes therein, and anchoring pins for said lug selectively engageable with holes in said bracket whereby said coupling member may be adjustably secured and thereby support the hopper in selected angular use positions.

2. A conveyor apparatus comprising an elevator including an elongated body member provided with a way and an endless conveyor operatively associated with the way, a hopper including an elongated body member provided with a way and with an endless conveyor operatively associated with the way, coupling means for supportingly and pivotally coupling said hopper body member to the front end of said elevator body member with the inner end of the hopper conveyor in discharging relation to the said elevator conveyor and which permits the pivotal adjustment of said hopper body member to collapsed position upon and substantially parallel to the elevator body member and to outwardly projecting variable use positions, said coupling means comprising upwardly projecting laterally spaced brackets disposed at the front end of said elevator body member and between which the inner end of said hopper body member is disposed, said hopper body member having coupling members pivotally mounted on said brackets, a counterbalance adjustably connected at its outer end to said hopper body member in substantially spaced relation to its pivotal connection to said brackets on said elevator, a flexible connector member for the inner end of said spring to one of said coupling members on said hopper, said coupling member being provided with an upwardly projecting arm with which said spring connector member is slidably and guidingly engaged and which is provided with a lug with which said spring connector member engages when the hopper reaches partially collapsed position above said elevator, one of said brackets being provided with a plurality of vertically spaced holes, said coupling member being provided with a projecting lug disposed in overlapping relation to the portion of the bracket having the spaced holes therein, and anchoring pins for said lug selectively engageable with holes in said bracket whereby said coupling member may be adjustably secured and thereby support the hopper in selected angular use positions.

3. A conveyor apparatus comprising a portable elevator including an elongated body member provided with a way and an endless conveyor operatively associated with the way, supporting wheels on which the elevator body member is mounted for translation thereof and for vertical tilting adjustment, a hopper including an elongated body member provided with a way and with an endless conveyor operatively associated with the way, coupling means for supportingly and pivotally coupling said hopper body member to the front end of said elevator body member with the inner end of the hopper conveyor in discharging relation to the said elevator conveyor and which permits the pivotal adjustment of said hopper body member to collapsed position and to outwardly projecting use position, said coupling means comprising upwardly projecting laterally spaced brackets disposed at the front end of said elevator body member and between which the inner end of said hopper body member is disposed, said hopper body member having coupling members pivotally mounted on said brackets, a counterbalance spring connected at its outer end to said hopper body member in substantially spaced relation to its pivotal connection to said brackets on said elevator, and a flexible connector member for the inner end of said spring to one of said coupling members on said hopper, said coupling member being provided with an upwardly projecting arm with which said spring connector is slidably and guidingly engaged and which is provided with a lug with which said spring connector member engages when the hopper reaches partially collapsed position above said elevator.

4. A conveyor apparatus comprising an elevator including an elongated body member provided with a way and an endless conveyor operatively associated with the way, a hopper including an elongated body member provided with a way and with an endless conveyor operatively associated with the way, coupling means for supportingly and pivotally coupling said hopper body member to the front end of said elevator body member with the inner end of the hopper conveyor in discharging relation to the said elevator conveyor and which permits the pivotal adjustment of said hopper body member to collapsed position upon and substantially parallel to the elevator body member and to outwardly projecting use position, said coupling means comprising upwardly projecting laterally spaced brackets disposed at the front end of said elevator body member and between which the inner end of said hopper body member is disposed, said hopper body member having coupling members pivotally mounted on said brackets, a counterbalance spring adjustably connected at its outer end to said hopper body member in substantially spaced relation to its pivotal connection to said brackets on said elevator, and a flexible connector member for the inner end of said spring to one of said coupling members on said hopper, said coupling member being provided with an upwardly projecting arm with which said spring connector is slidably and guidingly engaged and which is provided with a lug with which said spring connector member engages when the hopper reaches partially collapsed position above said elevator.

5. A conveyor apparatus comprising a portable elongated elevator, supporting wheels on which the elevator is mounted for translation thereof and for vertical tilting adjustment, a hopper having an elongated body member, means for supportingly and pivotally coupling said hopper body member to the front end of said elevator with the inner end of the hopper in discharging relation to the said elevator and which permits adjustment of said hopper to collapsed position upon and substantially parallel to the elevator and to outwardly projecting variable use positions, said coupling means comprising upwardly projecting brackets disposed at the front end of said elevator and between which the inner end of said hopper body member is disposed, said hopper body member having coupling members pivotally mounted on said brackets, a counterbalance spring adjustably connected at its outer end to said hopper body member in substantially spaced relation to its pivotal connection to said brackets on said elevator, a connector member for the inner end of said spring to said coupling member on said hopper, said coupling member being provided with an upwardly projecting arm provided with a lug with which said spring connector member engages after the hopper reaches partially collapsed position, one of said brackets on said elevator being provided with a plurality of vertically spaced holes, said coupling member being provided with a projecting lug disposed in overlapping relation to the portion of the bracket having the spaced holes therein, and anchoring pins selectively engageable with holes in said bracket whereby said coupling member may be adjustably secured and thereby support the hopper in various angular use relations.

6. A conveyor apparatus comprising an elongated elevator, a hopper having an elongated body member, means for supportingly and pivotally coupling said hopper body member to the front end of said elevator with the inner end of the hopper in discharging relation to the said elevator and which permits adjustment of said hopper to collapsed position and to outwardly projecting variable use positions, said coupling means comprising upwardly projecting brackets disposed at the front end of said elevator and between which the inner end of said hopper body member is disposed, said hopper body member having coupling members pivotally mounted on said brackets, a counterbalance spring connected at its outer end to said hopper body member in substantially spaced relation to its pivotal connection to said brackets on said elevator, a connector member for the inner end of said spring to said coupling member on said hopper, said coupling member being provided with an upwardly projecting arm provided with a lug with which said spring connector member engages after the hopper reaches partially collapsed position, one of said brackets on said elevator being provided with a plurality of vertically spaced holes, said coupling member being provided with a projecting lug disposed in overlapping relation to the portion of the bracket having the spaced holes therein, and anchoring pins selectively engageable with holes in said bracket whereby said coupling member may be adjustably secured and thereby support the hopper in various angular use relations.

7. A conveyor apparatus comprising a portable elongated elevator, supporting wheels on which the elevator is mounted for translation thereof and for vertical tilting adjustment, a hopper having an elongated body member, means for supportingly and pivotally coupling said hopper body member to the front end of said elevator with the inner end of the hopper in discharging relation to the said elevator and which permits adjustment of said hopper to collapsed position upon and substantially parallel to the elevator and to outwardly projecting use position, said coupling means comprising upwardly projecting brackets disposed at the front end of said elevator and between which the inner end of said hopper body member is disposed, said hopper body member having coupling members pivotally mounted on said brackets, a counterbalance spring adjustably connected at its outer end to said hopper body member in substantially spaced relation to its pivotal connection to said brackets on said elevator, and a connector member for the inner end of said spring to said coupling member on said hopper, said coupling member being provided with an upwardly projecting arm provided with a lug with which said spring connector member engages after the hopper reaches partially collapsed position.

8. A conveyor apparatus comprising an elongated elevator, a hopper having an elongated body member, means for supportingly and pivotally coupling said hopper body member to the front end of said elevator with the inner end of the hopper in discharging relation to the said elevator and which permits adjustment of said hopper to collapsed position and to outwardly projecting use position, said coupling means comprising upwardly projecting brackets disposed at the front end of said elevator and between which the inner end of said hopper body member is disposed, said hopper body member having coupling members pivotally mounted on said brackets, a counterbalance spring connected at its outer end to said hopper body member in substantially spaced relation to its pivotal connection to said brackets on said elevator, and a connector member for the inner end of said spring to said coupling member on said hopper, said coupling member being provided with an upwardly projecting arm provided with a lug with which said spring connector member engages after the hopper reaches partially collapsed position.

9. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting variable use positions, said coupling means comprising upwardly projecting brackets disposed at the front end of said elevator, said hopper having coupling members pivotally mounted on said brackets, a counterbalance spring adjustably connected at its outer end to said hopper body member in substantially spaced relation to its pivotal connection to said elevator, a flexible connector member for the inner end of said spring to said coupling member on said hopper, said coupling member being provided with an upwardly projecting arm with which said spring connector member is guidingly engaged and which is provided with a lug with which said spring connector member engages when the hopper reaches partially collapsed position, and means for adjustably connecting said coupling member to said elevator.

10. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting use position, said coupling means comprising upwardly projecting brackets disposed at the front end of said elevator, said hopper having coupling members pivotally mounted on said brackets, a counterbalance spring connected at its outer end to said hopper body member in substantially spaced relation to its pivotal connection to said elevator, a flexible connector member for the inner end of said spring to said coupling member on said hopper, said coupling member being provided with an upwardly projecting arm with which said spring connector member is guidingly engaged and which is provided with a lug with which said spring connector member engages when the hopper reaches partially collapsed position, and means for adjustably connecting said coupling member to said elevator.

11. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting variable use positions, said coupling means comprising upwardly projecting brackets disposed at the front end of said elevator, said hopper having coupling members pivotally mounted on said brackets, a counterbalance spring adjustably connected at its outer end to said hopper body member in substantially spaced relation to its pivotal connection to said elevator, and a flexible connector member for the inner end of said spring to said coupling member on said hopper, said coupling member being provided with a lug with which said spring connector member engages when the hopper reaches partially collapsed position.

12. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting use position, said coupling means comprising upwardly projecting brackets disposed at the front end of said elevator, said hopper having coupling members pivotally mounted on said brackets, a counterbalance spring connected at its outer end to said hopper body member in substantially spaced relation to its pivotal connection to said elevator, and a flexible connector member for the inner end of said spring to said coupling member on said hopper, said coupling member being provided with a lug with which said spring connector member engages when the hopper reaches partially collapsed position.

13. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting variably tilted use positions, said hopper body member having a coupling member pivotally mounted on said elevator, a counterbalance spring adjustably connected at its outer end to said hopper in substantially spaced relation to its pivotal connection to said elevator and to said coupling member on said hopper, said coupling member being provided with a stop member for the inner end portion of said spring when the hopper is in partially collapsed inwardly inclined position relative to said elevator, and means for adjustably connecting said hopper coupling member to said elevator.

14. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting use position, said hopper body member having a coupling member pivotally mounted on said elevator, a counterbalance spring connected at its outer end to said hopper in substantially spaced relation to its pivotal connection to said elevator and to said coupling member on said hopper, said coupling member being provided with a stop member for the inner end portion of said spring when the hopper is in partially collapsed inwardly inclined position relative to said elevator, and means for adjustably connecting said hopper coupling member to said elevator.

15. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting variably tilted use positions, said hopper body member having a coupling member pivotally mounted on said elevator, and a counterbalance spring adjustably connected at its outer end to said hopper in substantially spaced relation to its pivotal connection to said elevator and to said coupling member on said hopper, said coupling member being provided with a stop member for the inner end portion of said spring when the hopper is in partially collapsed inwardly inclined position relative to said elevator.

16. A conveyor apparatus comprising an elevator provided with conveyor means, a hopper provided with conveyor means, coupling means for supportingly and pivotally coupling said hopper to the front end of said elevator in discharging relation thereto and which permits the adjustment of said hopper to collapsed position above the elevator and to outwardly projecting use position, said hopper body member having a coupling member pivotally mounted on said elevator, and a counterbalance spring connected at its outer end to said hopper in substantially spaced relation to its pivotal connection to said elevator and to said coupling member on said hopper, said coupling member being provided with a stop member for the inner end portion of said spring when the hopper is in partially collapsed inwardly inclined position relative to said elevator.

References Cited in the file of this patent

UNITED STATES PATENTS 2,577,328   Hyman _____ Dec. 4, 1951